May 1, 1934.  A. SCHAUS  1,957,182
COUNTER CURRENT LEACHING PROCESS
Filed Nov. 11, 1930
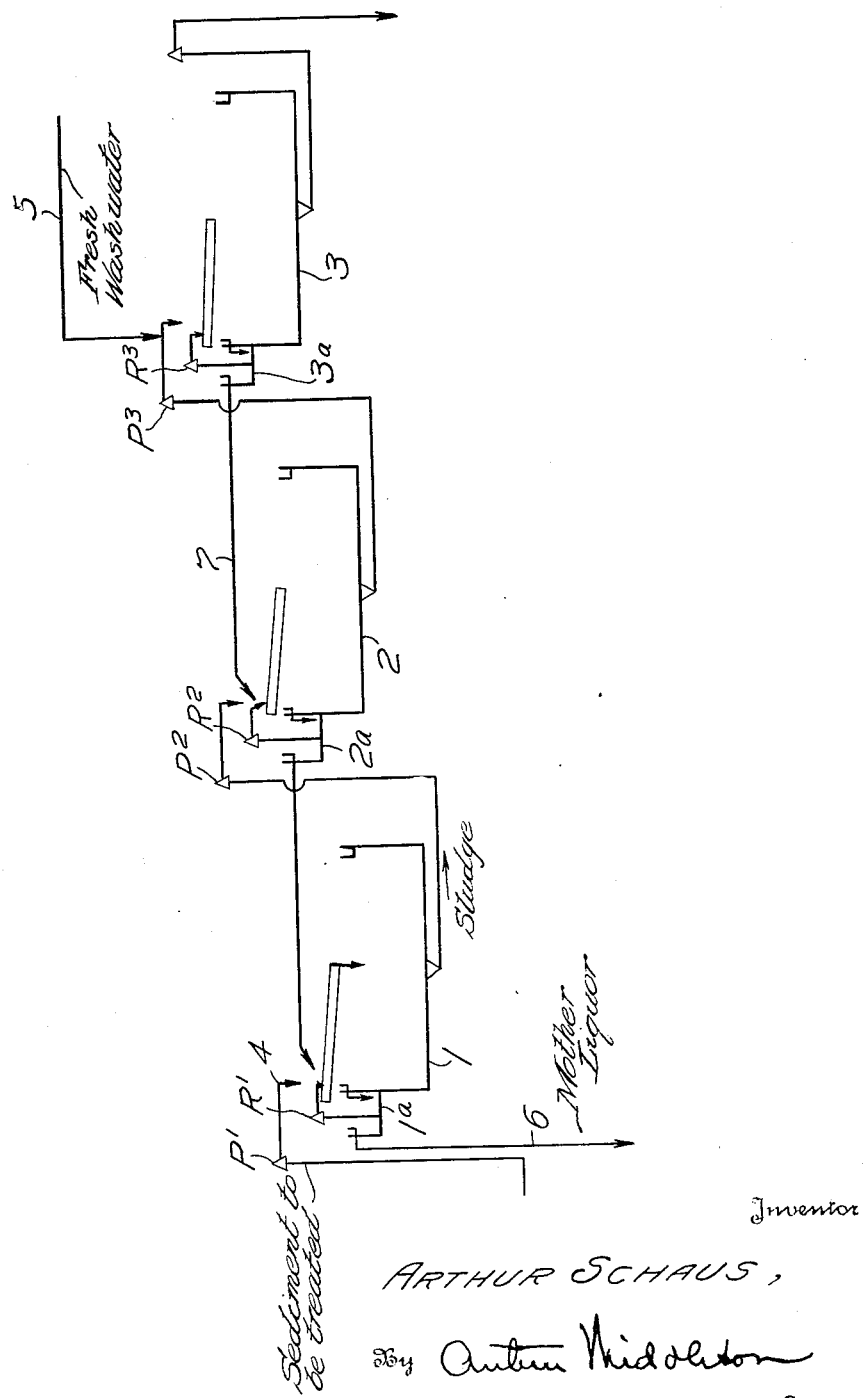
Inventor
ARTHUR SCHAUS,
By Arthur Middleton
Attorney Patented May 1, 1934

1,957,182

UNITED STATES PATENT OFFICE 1,957,182

COUNTER-CURRENT LEACHING PROCESS

Arthur Schaus, Paris, France, assignor, by mesne assignments, to The Dorr Company, Inc., New York, N. Y., a corporation of Delaware Application November 11, 1930, Serial No. 494,840
In France November 13, 1929

1 Claim. (Cl. 23—268)

For the recovery of certain useful elements contained in thickened sediments produced by previous treatment, and containing, also, residual solid matter to be eliminated, there is usually employed continuous counter-current washing, which consists in circulating in a reverse direction in a series of successive tanks or reservoirs, the wash water and the sediments to be treated. In each tank there takes place by decantation, clarification of the solid material which falls in the form of sludge to the bottom of the tank from which this sludge is taken, from whence it is conveyed into the following tank. At the discharge from the last tank in which the sludge circulates, that is to say, the first in which the wash water is introduced, the sludge contains little else than solid material, at the discharge from the tank at the opposite end, the mother liquor is discharged containing in solution practically all of the elements that are desired to be recovered.

But while decantation proceeds under satisfactory conditions without requiring too great settling areas, which, in turn, require the use of excessively cumbersome apparatus, it is necessary that the degree of dilution of the solid material in the wash water, that is to say, the relation between the volume of this water and the weight of the residual solid material, should be sufficiently high.

It is known that for high dilution, the necessary decantation area is reduced, up to a critical dilution point, below which the necessary area increases very rapidly in proportion to the decrease in dilution. In other words, if the settling rate is considered a function of the extent of dilution of solids in the feed, then a graphic curve indicating the settling rate would have a break or rapid drop as it enters a certain lower range of dilutions. It is therefore worth while to select for the degree of dilution, the critical degree mentioned, which however varies within certain limits with the nature of the sediments to be treated.

However, one meets another difficulty with the adoption of this relatively high critical dilution, which involves the use of a much larger quantity of wash water, than it is ordinarily permissible to use, because the use of a large quantity of water results in practice in a mother liquor of a very weak concentration and, for the recovery of the elements which it contains, this involves excessive expense for its evaporation.

The process, according to the present invention, permits on the other hand the use for counter-current washing of a critical degree of dilution, that is to say, the most advantageous, without requiring the use of a quantity of water greater than the quantity normally permissible.

This process, according to which there is circulated in the usual manner the sediments to be treated and the wash water in opposite directions, characterized by the fact that the wash water, in place of circulating normally and continuously in the same direction, is recirculated a number of times at the same point, which increases the extent of the effective action of the wash water and consequently the degree of dilution which, by regulating the rate of flow of the recirculation mentioned, may be brought to the precise critical strength desired.

For application of the process to counter-current washing carried out in a series of tanks or reservoirs thru which the wash water passes in succession, the "recirculation" of this water is carried out by returning to each tank overflow therefrom.

The apparatus permitting the operation of the process may be of any known type; the only required feature is that it includes at the outlet from each tank appropriate means such as a pump for forcing a part of the wash water discharging from the corresponding tank to return thereto. There is shown on the attached drawing schematically and simply in the form of an example, a diagrammatic form of construction of an apparatus permitting the operation of the process according to this invention. This apparatus comprises essentially a series of tanks 1, 2, 3, stepped up vertically. The thickened sediments to be treated are discharged into the first lower tank 1 by pump $P^1$ thru channel 4. The sludge which is deposited on the bottom of the reservoir 1 is thrown out by a corresponding pump $P^2$ which discharges this sludge into the second tank 2. From same, a pump $P^3$ withdraws the sludge depositing in the tank 2 to discharge it into the third tank 3. This tank is the last in which the sludge circulates and it is in this tank that the fresh wash water is introduced, thru a channel 5 for example. This wash water circulates in tank 3, then passes into tank 2, thence finally into tank 1, so that it circulates in a direction reverse from the direction of the sediments to be treated.

As has been noted above, this wash water picks up elements that are worth recovering, such, for example, as salt, if it is applied to the treatment of brines obtained by leaching raw salts. The sludges obtained during clarification of these brines contain residual solid material and a relatively high proportion of salts which it is naturally advantageous to recover. During the washing of these sludges, in the apparatus set forth, the salt is picked up by the wash water and almost the total amount of the salt is discharged with the mother liquor passing from the last reservoir 1 thru the channel 6. In each reservoir 1, 2, 3, there takes place a decantation of the solid material which is deposited on the bottom of the tanks.

But it has been seen above that while this decantation takes place under good conditions, it is necessary that the degree of dilution, namely the relation between the volume of wash water and the weight of the residual solid material, should be sufficiently high and at least equal to the critical degree which has been determined. It has likewise been noted that the adoption of such a degree of dilution involves the utilization of an excessive quantity of wash water.

In conformity with the invention to obtain the desired results, and to apply the critical degree of dilution without employing an excessive quantity of water, the same wash water is circulated a number of times in each of the tanks. In other words, there is carried out with this wash water some "recirculation"—due to which the effective action of this wash water is increased in each of the tanks. At the discharge from tank 3 for example, the wash water flows into an overflow reservoir $3^a$ from which a pump $R^3$ forces it to pass again into the corresponding tank 3. It is evident that the effective flow of the wash water in this tank 3 will be equal to the sum of the flow of the fresh water entering thru the channel 5 and the flow of that from pump $R^3$. Therefore the flow from pump $R^3$ can be circulated in such a way that the total effective flow will be that desired to obtain the desired degree of dilution.

From the overflow reservoir $3^a$, the wash water passes thru channel 7 into the reservoir 2, and there has been provided for reservoir 2 a recirculation pump $R^2$ operating under the same conditions as pump $R^3$ above mentioned. There is likewise, employed a pump $R^1$ returning wash water to the first tank 1.

It is evident that with this arrangement, the effective flow of the wash water in each tank is increased, that is, the degree of dilution which is favorable to good decantation is increased without increasing the flow of fresh wash water. Under these conditions, the mother liquor flowing out thru channel 6 has a very high concentration and the recovery of the salts or other elements that it contains is easy and does not involve excessive expense.

It is understood that the process according to this invention, may be applied to all existing apparatus for counter-current washing, that which is illustrated herein being given only as an example.

Likewise, the means which carry out the "recirculation" of the wash water, and which in the present instance are pumps, may comprise any equivalent means.

Moreover it follows that the invention has been described and set forth herein only in a manner purely explanatory but not limiting, and that there can be introduced modifications in details without altering the spirit.

I claim:

The process for the continuous recovery by counter-current washing and decantation of certain elements from thickened sediments produced by preceding treatments, which consists in circulating in opposite directions the sediments to be treated and the wash water, recirculating overflowing wash water to a point of sediment feed to increase correspondingly the effective flow of the wash water and the degree of dilution of the residual solid material.

ARTHUR SCHAUS.